United States Patent

Butts

[15] 3,664,146

[45] May 23, 1972

[54] FOOD PRODUCT QUICK FREEZING METHOD AND APPARATUS

[72] Inventor: Edward E. Butts, Niles, Mich.
[73] Assignee: Clark Equipment Company
[22] Filed: Dec. 18, 1970
[21] Appl. No.: 99,566

[52] U.S. Cl............................62/63, 62/374, 99/198
[51] Int. Cl..................................F25d 13/06
[58] Field of Search................62/60, 63, 64, 341, 345, 374, 62/375, 380; 99/194, 198

[56] References Cited

UNITED STATES PATENTS

| | | | |
|---|---|---|---|
| 2,807,548 | 9/1957 | Morrison | 62/64 X |
| 2,718,124 | 9/1955 | Gilliam | 62/345 X |
| 2,968,568 | 1/1961 | Preuss | 99/198 X |
| 2,059,970 | 11/1936 | Robillard | 62/374 X |
| 3,267,585 | 8/1966 | Futer | 62/63 X |
| 1,605,537 | 11/1926 | Gay | 99/198 X |
| 1,907,649 | 5/1933 | Marx | 62/380 X |
| 2,979,914 | 4/1961 | Garland | 62/64 |
| 3,479,833 | 11/1969 | Waldin | 62/63 |

Primary Examiner—Meyer Perlin
Assistant Examiner—Ronald C. Capossela
Attorney—Kenneth C. Witt, John C. Wiessler, Robert H. Johnson and Lewis J. Lamm

[57] ABSTRACT

This is a method and apparatus for the quick freezing of foods products, particularly meat, in which the food product is immersed in a liquid coolant maintained below 32° F. The liquid coolant, in the preferred form, is a halocarbon compound particularly dichlorodifluoromethane (refrigerant 12). The food product is pressed into a flat position by being held between two belts as it is immersed in the refrigerant for freezing. After freezing, the product floats to the top of the refrigerant and is retrieved and passed between low pressure steam or hot air jets to thaw the surface of the food parcel to prepare it for wrapping. After the food parcel is wrapped, it is again refrozen.

6 Claims, 1 Drawing Figure

PATENTED MAY 23 1972 3,664,146
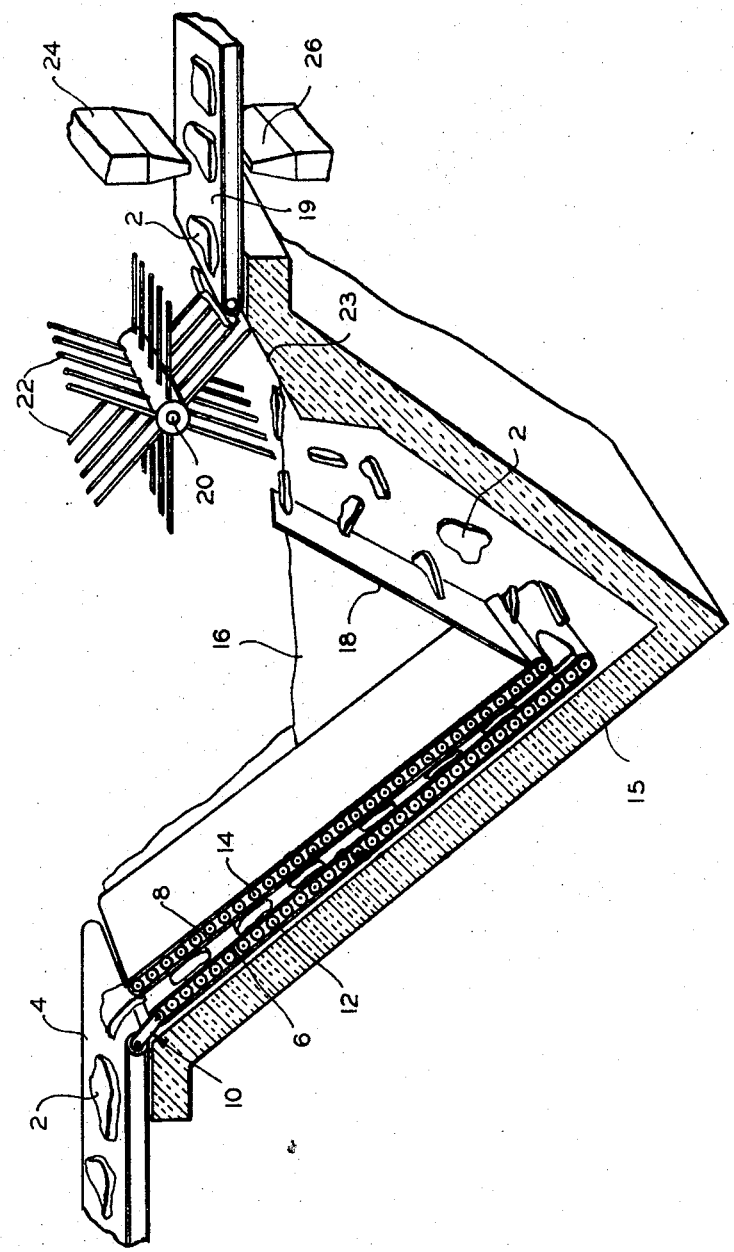
INVENTOR
EDWARD E. BUTTS
BY Lewis J. Lamm
ATTORNEY

FOOD PRODUCT QUICK FREEZING METHOD AND APPARATUS

BACKGROUND AND SUMMARY OF THE INVENTION

This invention relates to quick freezing of food product parcels by placing the parcels between two pressure belts and immersing the parcel in a liquid coolant to freeze same. After the food product is frozen, it is removed from the liquid coolant and the surface is thawed by hot air or low pressure steam to recover product color and promote wrapper adhesion. In the preferred form of the present invention, the food product is red meat, the pressure belts are spaced adjustable stainless steel conveyor belts, and the liquid coolant is a halocarbon known as refrigerant 12.

Also in the preferred form, hot air or low pressure steam jets are used to surface condition the meat to promote wrapper adherence and to recover the red meat color.

The prior art discloses the quick freezing of food products by immersion in refrigerant 12. The prior art also discloses the use of cold pressure plates for quick freezing food stuff.

In the present invention, sliced meat is fed between two stainless steel adjustable pressure belts to flatten the meat and thereby avoid frost pockets and promote tight film. The adjustable pressure belts carry the meat into a refrigerant bath and restrain it in the flat position until it is frozen. After the meat is frozen, it is ejected at the end of the belt and floats to the top of the refrigerant by its own buoyancy and then removed. After the meat is removed, its surface is conditioned to recover the red meat color and to promote the adherence of the meat wrapping material.

It is, therefore, an object of the present invention to provide an efficient means for quick freezing food products, particularly meat, by immersing the same in a liquid refrigerant and thereafter conditioning the surface of the meat to recover its original color.

It is another object of the present invention to provide a means for immersion freezing of food product parcels having two parallel flat surfaces and thereafter thawing the surfaces to promote wrapper adherence and color reversion.

It is a further object of the present invention to provide an efficient means for freezing food by immersion in liquid refrigerant.

Further objects of the present invention will become apparent from inspection of the drawing and specification and will be pointed out in the claims.

BRIEF DESCRIPTION OF THE PREFERRED EMBODIMENT

The FIGURE is a cross-sectional view of the apparatus embodying the present invention.

SPECIFIC DESCRIPTION OF THE PREFERRED EMBODIMENT

Referring to the Figure, 2 represents a food parcel which, in the preferred embodiment, is meat. The belt conveyor 4 is of the normal type. 6 is a stainless steel (or other suitable material) pressure belt and 8 is a similar stainless steel belt which is adjustable to vary the distance between the belt 8 and belt 6. The belt 8 may be spring biased toward belt 6 to promote gripping of the food product particle 2 between the belt 8 and the belt 6 as these belts carry the parcel downward and immerse it in the refrigerant 16. The stainless steel belts 6 and 8 are biased against the food parcel 2 by means of rollers 12 and 14, respectively. 15 is an insulated tank for containing the refrigerant 16. 16 is a liquid coolant which, in the preferred form, is a halocarbon compound. In one specific embodiment, it is dichlorodifluoromethane, commonly known as refrigerant 12 and sold under the trade name of Freon 12. A baffle 18 is located in the tank to guide the food particle 2 to an area on the surface where it can be picked up from the surface of the refrigerant and placed on the conveyor belt 19. 20 is a rotating product removing mechanism having a multiplicity of radially extending rods 22. The belt conveyor 19 may be of any commercial type conveyor suitable, preferably one having a mesh construction pervious to air. The mechanism for removing the food particles from the surface of the liquid coolant 16 may be of any suitable type, for example, it may be an inclined belt, etc.

24 and 26 are opposed hot air or low pressure steam jets of any suitable type for thawing both the top and bottom surface of the food parcel 2 as it passes between jets 24 and 26 on the perforated or mesh conveyor belt 19.

In the preferred embodiment, the food parcel 2 is red meat which is sliced to a uniform thickness and placed on a stainless steel belt conveyor 4. Belts 6 and 8 are stainless steel belts which are power driven from the belt 4 by the chain drive 10. These belts are so driven that their mating surfaces are driven downward at the same uniform linear speed. The belt 6 is supported by closely spaced rollers 12 also made of stainless steel. The belt 8, in like manner, is backed up by closely spaced rollers 14. The belt 8 is adjustable and so contoured that the entrance to the opening between the belts 6 and 8 is wedge shaped and the distance between the belts is readily adjustable to accommodate different thicknesses of meat. The belt 8 is spring biased toward the belt 6 so as to maintain pressure on the meat as it is carried down into the liquid refrigerant 16. The linear speed of the belts 6 and 8 is adjustable and the speed is so adjusted as to permit the food parcel to be crust frozen or completely frozen when it is ejected at the lower end of the conveyor system. The liquid coolant 16 may be any liquid having suitable physical and chemical characteristics, but in the preferred form, is a halocarbon compound sold under the trade name of Freon 12. The food parcel 2, here shown as meat parcels, having a lower specific gravity than the liquid 16, tends to float to the top of the liquid after it is ejected at the lower end of the conveyors 6 and 8. A baffle 18 of suitable material preferably stainless steel is so located in the liquid coolant tank 15 as to guide the food parcels to a surface area where they can be picked up and placed on the conveyor 19 by the transfer mechanism 20. The transfer mechanism 20 is here shown as a rotational device having radially extending rods 22 so spaced as to pick up the food parcels 2 and push them up the ramp surface 23 onto the conveyor 19. The conveyor 19 is a standard belt conveyor in which the belt material is a woven wire mesh or other material pervious to air. The hot air or low pressure steam jets 24 and 26 located on opposite sides of the belt have slots or small holes along their edge parallel to the belt to direct a stream of hot air or low pressure steam against the surface of the meat to thaw or condition the surface of same.

OPERATION OF THE PREFERRED EMBODIMENT

The red meat is sliced into uniform thick parcels 2 and fed by the conveyor 4 into the space between the conveyors 6 and 8. The conveyors 6 and 8 compress the meat and carry it into the liquid Freon 12 refrigerant thereby quick freezing the meat as it progresses downwardly. When the meat is crust frozen or completely frozen, it is ejected from the lower end of the belt conveyors and it floats upwardly to the surface of the refrigerant 16 guided by the baffle 18. The transfer mechanism 20 picks up the meat out of the refrigerant and places it on the conveyor 19. Red meat, when it is frozen in this manner, turns white and its eye appeal is lost. It is, therefore, necessary to restore the characteristic red meat color before it is placed on display for marketing. It has been found that subjecting the surface to a hot air or stream blast thaws the ice crystal on the surface of the meat and restores the red meat color. This thawing of the ice crystals also moistens the surface and promotes adherence to the wrapper. To obtain this surface thawing, the meat is fed in between the two jets of hot air or steam 24 and 26 after which the meat is wrapped and placed in an atmosphere maintained at below 32° F. to refreeze the surface and to maintain the interior of the meat parcel frozen.

Having thus described the preferred embodiment of the present invention, it will, of course, be understood that various changes may be made in the particular equipment to freeze the food parcel and that various liquid refrigerants may be used without departing from the scope of the invention which consists of the matter shown and described herein and set forth in the appended claims.

I claim:

1. A method of freezing and preparing for wrapping of uniform thickness sliced red meat comprising the steps of:

placing the slices of unfrozen red meat between parallel pervious restraining members, immersing the red meat while thus restrained in liquid dichlorodifluoromethane maintained at a temperature below 32° F. for a sufficient time to completely freeze the red meat, releasing the frozen red meat from the restraining members and allowing it to float to the top of the liquid dichlorodifluoromethane, removing the frozen meat from the liquid dichlorodifluoromethane and thereafter, subjecting the frozen meat to a current of low pressure hot gases a sufficient length of time to thaw the surface of said meat, to thereby freeze the meat by direct contact with the dichlorodifluormethane and thereafter thaw the surface of said meat to improve its color and facilitate wrapping without inclusion of air bubbles.

2. A method of freezing and preparing for wrapping of uniform thickness sliced red meat as claimed in claim 1 in which:

the low pressure hot gas to which the frozen meat is subjected is low pressure steam.

3. A method of freezing and preparing for wrapping of uniform thickness sliced red meat as claimed in claim 1 in which:

the low pressure hot gas to which the frozen meat is subjected is low pressure hot air.

4. Apparatus for quick freezing red meat slices of uniform thickness comprising:

a contained quantity of liquid dichlorodifluoromethane maintained at a temperature less than 32° F., a pair of parallel pervious belt conveyors spaced from each other a distance approximately the thickness of said meat slices so as to restrain said meat slices therebetween and so driven as to carry the meat slices placed therebetween into said liquid dichlorodifluoromethane and eject said particles into said liquid dichlorodifluoromethane after the meat slices are completely frozen, a pervious belt conveyor located adjacent said contained liquid dichlorodifluoromethane and so driven as to carry frozen meat slices placed thereon away from said coolant, means for removing said meat slices after they are completely frozen from said liquid coolant and placing them on said last mentioned conveyor, hot gas nozzles located above and below said last-mentioned conveyor and so arranged as to impinge hot gases on the surfaces of said frozen meat slices as said meat slices are carried on said last mentioned conveyor, whereby said meat slices are frozen by immersion in said liquid dichlorodifluoromethane and the surface thereof thereafter thawed by said hot gases impinged thereon to thereby, quick freeze said meat slices to preserve same and thereafter thaw the surface of said particles to expedite wrapping and enhance the appearance of said meat slices.

5. Apparatus for quick freezing red meat slices of uniform thickness as claimed in claim 4 in which:

the hot gas impinged on the surfaces of said red meat slices is hot air.

6. Apparatus for quick freezing red meat slices as claimed in claim 4 in which:

the hot gas impinged on the surface of said red meat slices is low pressure steam.

* * * * *